United States Patent Office 2,946,712
Patented July 26, 1960

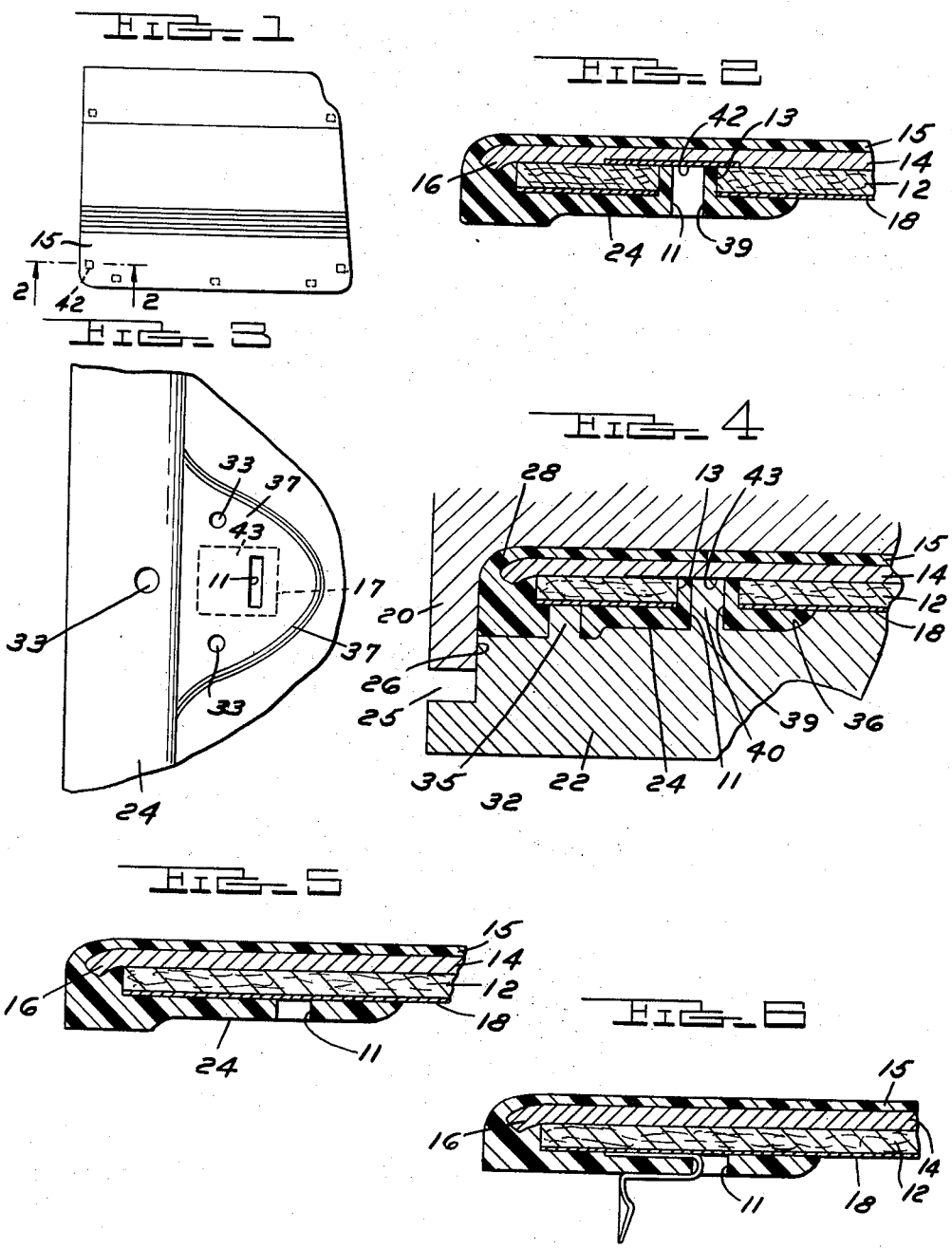

2,946,712

LAMINATED TRIM SHEET

James W. Greig, Grosse Pointe Park, Mich., assignor to Woodall Industries, Incorporated, Detroit, Mich., a corporation of Michigan Filed May 22, 1956, Ser. No. 586,531

4 Claims. (Cl. 154—45.9)

This invention relates to laminated trim sheets, trim panels, or the like, which are adapted to be mounted upon a supporting rfame.

It relates primarily to a laminated trim sheet or trim panel such as is adapted for use in the interior of an automobile body.

It relates particularly to a padded upholstered trim panel having a core of soft, fibrous wadding enclosed within a protective, moisture-resistant plastic envelope, which envelope is so formed as to support the core wadding and present an attractive embossed finish design, and which envelope is itself provided with the fastener-retaining means adapted to carry the fasteners which are employed to secure the panel to a support.

Heretofore trim panels such as are employed in automobile body interiors have commonly comprised a foundation or core layer which was provided with an outer finish layer covering the front surface and extending over the margin and onto the back thereof. This core layer was provided with fastener-receiving apertures or means adapted to cooperate with fastening devices to secure the panel upon a frame support.

The trim sheet of the instant application comprises a cast, flexible, rugged plastic finish layer of a shallow pan shape in cross section and the rim of which pan shape is provided with an inwardly extending flange overhanging the bottom of the pan shape and spaced therefrom. The core layer is preferably soft, flexible, and cushiony and disposed within the pan-shaped plastic layer with the marginal portion of the core layer received underneath the flange of the plastic layer. The flange of the plastic layer is provided with fastener-retaining means here shown in the form of fastener-receiving apertures adapted to cooperate with other fastening devices to secure the sheet to a support.

More particularly, the plastic layer in the instant structure is cast upon and into securement with the front face of the core layer and about the margin thereof and its inwardly projecting flange is cast into securement with the back of the core layer about the margin thereof.

The core layer fills the pan-shaped plastic layer. The rim of the pan shape is relatively heavy and is provided with an inwardly extending heavy flange which overhangs the back of the core adjacent to its margin. Such overhanging flange of the plastic layer is provided with fastener-receiving recesses or means adapted to cooperate with fastening devices to hold the panel to a support. The back of the core layer is covered with a plastic layer which is bonded to the overhanging flange portion of the first-mentioned plastic layer and forms therewith a complete plastic envelope enclosing the core. This plastic layer which covers the back of the core layer is relatively thin as compared with the first-mentioned plastic layer.

In one modification the panel comprises a core layer disposed within the pan-shaped plastic layer and secured thereto as hereinabove described and such core layer is provided with fastener-receiving recesses extending inwardly thereinto from its back surface and adjacent to the margin thereof and registering with the fastener-receiving recesses through the overhanging flange of the plastic layer. The overhanging flange of the plastic layer extends over onto such back surface of the core and surrounds, strengthens, and reinforces the recesses in the core and preferably extends into the recesses forming plastic liners for the side walls thereof.

In such modification the core layer may comprise two plies of material with the plastic layer extending over the margins of both plies and bonding them together and the back ply only of the core may be provided with the fastener-receiving recesses. Suitable reinforcing material may be provided between the two plies of the core overlying the recesses and forming reinforced bottoms therefor. Such reinforcement may be interposed as a strip between the two plies overlying the recesses. Fasteners are received into said recesses and have heads received between the two plies. The overhanding flange of the plastic layer furnishes the structural strength to carry the fasteners.

In another modification the fastener-receiving apertures are provided only in the overhanging marginal flange portion of the plastic layer which overlaps the back of the core layer. This overhanging flange of the plastic layer, adjacent to said fastener-receiving apertures, is preferably supported free from the core to provide a recess, adjacent to the aperture, between the plastic layer and the core, which recess is of a size to receive a part of a fastener underneath said flange.

In either modification the plastic layer provides the strength which holds the fasteners. In either modification the plastic layer forms an outer plastic envelope which carries, protects, and enseals the core. The front face portion of the envelope is thicker than the rear face portion and the margin is substantially heavier and thicker than either face portion. Such margin includes a heavy flange portion which overhangs the back of the core about its margin. In both modifications the overhanging flange of the margin carries the fasteners.

Other objects, advantages, and meritorious features will more fully appear from the specification, claims, and accompanying drawings, wherein:

Fig. 1 is an elevation of a trim panel embodying the invention;

Fig. 2 is a fragmentary vertical sectional view taken on the line 2—2 of Fig. 1;

Fig. 3 is an elevation of a fragment of the rear face of the panel looking at one of the fastener-receiving recesses of Fig. 2;

Fig. 4 is a fragmentary section through a portion of a die assembly showing my trim sheet therein during the process of its formation;

Fig. 5 illustrates a modified form, as compared with Figs. 2 and 4, of a fastener-receiving recess formation in the trim sheet; and Fig. 6 is a view taken on the same line as Fig. 5 showing a fastener inserted in position upon the panel.

This invention relates to the development which is shown in my copending applications: Serial No. 463,580, filed October 20, 1954, and Serial No. 555,459, filed December 27, 1955, now Patent No. 2,859,795.

In the two companion cases supra there is illustrated a laminated trim sheet such as a trim panel used in the interior of an automobile body. This laminated trim sheet comprises a soft, flexible, cushiony, fibrous core which may consist of one or more plies of felt, wadding, or the like. The core is completely surrounded by a plastic envelope which covers the opposite surfaces and extends over the margin of the core and protectively seals the core within the envelope. The plastic envelope is bonded to the core.

The rear face portion of the envelope is a thin film of plastic. The front face portion of the envelope is a relatively thick layer of plastic. This front face is preferably embossed to present a decorative design. The embossed plastic layer is cast upon the front face portion of the core and has a heavy cast marginal portion which extends over the margin of the core and is provided with a heavy flange which overhangs the back of the core and is bonded thereto about the margin of the core and is also bonded to the plastic film over the back of the core.

In the instant application, the relatively heavy cast plastic layer not only extends over the margin of the core but it has a rugged marginal flange portion that overhangs the margin of the back of the core and is bonded to the plastic film thereon. This overhanging flange portion is provided with fastener-receiving recesses or apertures adapted to receive fasteners to secure the trim sheet to a support. It is the flange of the plastic envelope through which securement of the trim sheet is made with the support.

The trim sheet as described comprises a flexible plastic envelope filled with a soft, cushiony core. The envelope consists of a relatively heavy pan-shaped plastic shell which makes up the front side wall, the marginal portion and an overhanging back marginal flange, and a relatively thin back wall bonded to the said overhanging flange. The overhanging flange carries the fasteners.

The core layer shown comprises two plies of material, a lower ply 12 and an upper ply 14. A single ply might be employed if desired. These plies are cut to the general shape desired for the sheet or panel. These core plies may be formed of soft, fibrous, cushiony wadding such as paper felt or the like. Both plies may be of this material, or if desired, the lower ply may be of cardboard and the upper ply of the wadding-like material. The upper ply is shown as preferably extended slopingly beyond the margin of the lower ply as at 16.

As described in the above-mentioned companion applications, in preparing the panel, one surface of the lower ply 12 is covered with a thin plastic film 18, and one surface of the upper ply 14 is coated with a thick layer of plastic 15. This coating may be accomplished in a roll-coating machine, or in any other desired manner.

Suitable plastisol compositions may be used. Plastisol may be defined as a dispersion or intimate mixture of vinyl resin in a liquid plasticizer with appropriate stabilizers, pigments, and other modifiers added. At room temperature plastisol is a liquid before it has been fused into the solid state. The plastisol is converted from the liquid to a solid form by heat. The requirement for this step is that the dispersion be heated to the critical temperature. A plastisol composition which has been found satisfactory is as follows:

FORMULA A

*Flexible plastisol thermoplastic*

| | Percent |
|---|---|
| Pigment, such as Supercarbovar paste or titanium dioxide paste | 12.2 |
| Filler (calcium carbonate) | 12.0 |
| Stabilizer DS–207 (lead salt) | 1.0 |
| Wetting agent (Triton X–100) | .5 |
| Plasticizer, di-iso-octyl-phthalate | 18.3 |
| Plasticizer tetra hydro furfuryl oleate | 13.0 |
| Polyvinyl chloride resin (Geon–121) | 43.0 |
| | 100.0 |

FORMULA B

*Rigid plastisol thermoplastic*

| | Percent |
|---|---|
| Pigment in polyester resin | .3 |
| Tri-octyl-phosphate plasticizer | 2.0 |
| Polyester resin | 17.8 |
| Staflex KA-plasticizer | 10.8 |
| ATC catalyst (benzoyl peroxide) | .2 |
| Dythal—lead stabilizer | 2.0 |
| Calcium carbonate filler | 11.4 |
| Vinyl copolymer resin (Geon 202) | 11.5 |
| Polyvinyl chloride resin (Geon 121) | 44.0 |
| | 100.0 |

FORMULA C

*Thermosetting resin*

| | |
|---|---|
| Polyester resin—known in trade such as Paraplex P–47 and P–13 | 80.0 |
| Filler such as calcium carbonate | 16.4 |
| Catalyst—ATC (benzoyl peroxide) | 1.6 |
| Pigment—such as a color paste | 2.0 |
| | 100.0 |

The plastic coating applied to both layers may be of the same material. The plastic coating applied to the layer 14 is a relatively thick coating in which an excess of material over that required to cover the top surface of the ply is provided. Such excess is used to extend over the margin and to overlap the underside as hereinafter set forth.

Following the coating of the two plies and the placing of the upper ply 14 upon the lower ply 12, the two-ply sheet assembly is placed between the platens or dies of a press. Upper and lower dies of a press are indicated in Fig. 4 as 20 and 22, respectively. The upper die head 20 is formed as at 26 to be received over the lower die head 22. A stop 25 surrounds the lower die to limit the downward movement of the upper die thereover. The upper die is contoured as at 28 to provide a rounded edge about the margin of the plastic sheet formed therein. The moulding face of the upper die may be configured to produce any desired embossed design in the plastic finish layer.

As described in said copending applications, these dies are heated in a conventional manner and are so operated that the plastic coating of the core plies is heated to the critical point of the plastic so that under the pressure of the dies the plastic flows over the surface of the core layer underneath the die 20 and about the margin of the core plies and underneath the lower ply of the core forming a plastic flange 24 which extends underneath or overhangs the margin of the back of the core. The plastic marginal portion 30 is shown as relatively heavy. The flange portion 24 is relatively heavy.

To form the flange 24 the lower die is cut away as at 32 to permit the flow of plastic underneath the core. The lower die is further cut away as at 36 to provide small cutout areas which define what might be termed ears 37 of plastic extending inwardly from the flange portion 24 of the plastic layer as shown in Fig. 3. Such ears surround each recess or aperture opening 13 in the lower ply, and each registering aperture 11 formed in the plastic. These ear parts 37 of plastic which extend inwardly from the marginal portion 24 reinforce and surround each aperture 13 in the core so that the aperture is suitable to properly retain a fastener.

The lower die is formed with projections 40, one for each aperture 11, and such projections form the apertures 11 in the plastic flange portion 24 or more particularly in the ears 37. The lower die is also provided with supporting pins 35, one being shown in Fig. 4, but three are preferably provided. These pins project sufficiently above the face of the die 22 to engage and support the core layer thereabove to permit plastic to flow thereunder to form the ears 37. Fig. 3 shows three apertures 33 which were formed by the three pins 35 in the plastic ears 37 and the overhanging flange 24. It will be noted that the plastic also extends inwardly over the inner side wall of the opening forming a plastic liner therefor as indicated at 39.

Where the ply 12 is provided with apertures 13 these projections 40 of the lower die extend into the openings 13, as shown in Fig. 4. This projection 40 is of such diameter that space is left around it and within the opening, so that plastic 39 can flow thereinto over the side wall of the opening. This projection 40 might be of such a height that plastic would flow underneath the end thereof and over the bottom of the recess. If the core ply is not provided with an aperture 13, the projection 40 is of such height only as to form a shallow aperture 11 in the plastic as shown in Figs. 5 and 6.

In certain cases it has been found desirable, however, to provide other means for covering the bottoms of the recesses 13 through the base ply 12. Such means may be in the form of a plate or strip of plastic, metal, or other suitable material 42 (Fig. 2) interposed between the two layers overlying the apertures 13. This strip may be adhesively secured in place. It might be of any suitable rugged, strong material adapted to serve as a bottom within the recess against which the head of a fastener might lie. The surface of the plate or strip exposed to plastic may be suitably treated as hereinafter set forth so that the plastic will not bond thereto.

Fasteners of any suitable conventional character may be used. Fig. 6 shows a conventional fastener in use. It has a head portion receivable within the opening and receivable between the flange 24 and the lower core ply 12. The shank of the fastener projects rearwardly away from the under face of the panel and is so formed as to be received within provided openings in a suitable support.

In Figs. 5 and 6 the fastener-receiving aperture 11 is shown as extending only through the marginal flange portion 24 of the plastic layer. It does not extend into the core layer. That area of the lower ply 12 of the core layer adjacent to the aperture 11 and on the inside thereof, and outlined by dotted line 17 (Fig. 3), may be coated with a suitable lubricant 43 which will prevent the plastic from bonding thereto throughout the coated area. Such lubricant coating may be zinc stearate. This coating insures the provision of a free recess between the flange and the core layer into which the head of a fastener can be readily advanced. Such printing of non-bonding material may be employed between the two plies adjacent the bottom of a recess for the same purpose or over the plate or strip 42. If desired the non-bonding coating may be omitted, and the head of the fastener may be advanced into the soft, fibrous core underneath the flange.

In either modification, Figs. 2 and 4 or Figs. 5 and 6, whether the head of the fastener is received between the two plies of a two-ply core or directly between the flange and the core, such fastener is engaged underneath the plastic flange 24 and the plastic flange is sufficiently rugged to retain the fasteners to hold the panel on a support.

What I claim is:

1. A laminated trim sheet comprising, in combination, a cast flexible plastic finish layer of a shallow pan shape in cross section and having a marginal rim provided with an inwardly extending flange overhanging the bottom of the pan shape and spaced therefrom, said rim and flange of the plastic layer being self supporting as to shape and spacing of the flange from the bottom of the pan-shaped plastic layer, a cushionlike core layer disposed within the pan-shaped plastic layer with the marginal portion of the core layer received underneath the flange of the plastic layer, said plastic layer being cast in situ upon and into securement with the front face of the core layer and about the margin thereof and the flange of the plastic layer being cast in situ upon and into securement with the back face of the core layer, said plastic flange being provided with a series of fastener-receiving apertures extending therethrough underneath the core layer, said apertures adapted to receive fasteners therethrough to be engaged through and underneath the flange to secure the trim sheet to a support, said core layer being held to size and shape by the plastic layer.

2. A laminated trim sheet as defined in claim 1 characterized in that the flange of the plastic layer is provided with a plurality of ears cast integrally with the flange and into securement with the core layer, said ears being spaced apart along the flange and projecting away from the flange interiorly of the central expanse of the trim sheet, said fastener-receiving apertures through the plastic flange being located one in each of said ears of the flange.

3. A laminated trim sheet as defined in claim 1 characterized in that the flange of the plastic layer is provided with a plurality of ears cast integrally with the flange and into securement with the core layer, said ears being spaced apart along the flange and projecting away from the flange interiorly of the central expanse of the trim sheet, said fastener-receiving apertures through the plastic flange being located one in each of said ears of the flange, said core layer being provided with fastener-receiving recesses formed therein and registering with the apertures through the ear portions of the flange providing continuations thereof, each aperture through an ear of the plastic flange having a tubular extension projecting away from the plane of the flange about the perimeter of the aperture through said ear portion into and through the recess in the core layer providing a plastic lined fastener receiving aperture through the core layer.

4. A laminated trim sheet as defined in claim 1 characterized in that the core layer is formed of two juxtaposed plies of sheet material and the plastic layer is cast upon and into securement with the front face of the upper ply and about the margins of the two plies and underneath the marginal portion of the lower ply forming a flange thereover which is secured thereto, and the flange of the plastic layer is provided with a plurality of ears cast integrally therewith into securement with the lower face of the lower ply of the core layer, said ears being spaced apart along said flange and projecting away from the flange toward the central expanse of the trim sheet, said fastener-receiving apertures through the flange being located within each ear thereof, the lower ply of the core layer being provided with fastener-receiving apertures therethrough registering with the fastener-receiving apertures through said ears whereby a fastener may have a part passed through an aperture through an ear and through the registering ear through the lower ply of the core layer and engaged between the two plies of said core layer, said underside of the lower ply of the core layer being covered with a plastic layer to which the plastic flange is secured.

References Cited in the file of this patent

UNITED STATES PATENTS

| | | |
|---|---|---|
| 1,896,200 | Place | Feb. 7, 1933 |
| 1,979,131 | Woodall | Oct. 30, 1934 |
| 2,040,365 | Diehl et al. | May 12, 1936 |
| 2,586,978 | Murray | Feb. 26, 1952 |
| 2,684,320 | Lyijynen | July 20, 1954 |
| 2,699,416 | Lyijynen | Jan. 11, 1955 |
| 2,859,795 | Greig | Nov. 11, 1958 |